US011118749B2

(12) United States Patent
Nykerk (10) Patent No.: US 11,118,749 B2
(45) Date of Patent: Sep. 14, 2021

(54) SWITCHABLE MIRROR LENS ASSEMBLY (71) Applicant: Flex-N-Gate Advanced Product Development, LLC, Tecumeseh (CA)

(72) Inventor: Todd Nykerk, Holland, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 15/931,824

(22) Filed: May 14, 2020

(65) Prior Publication Data
US 2020/0363034 A1 Nov. 19, 2020

Related U.S. Application Data (60) Provisional application No. 62/847,410, filed on May 14, 2019.

(51) Int. Cl.
| *F21S 8/10* | (2006.01) |
| *F21S 41/37* | (2018.01) |
| *B60Q 1/14* | (2006.01) |
| *F21S 43/33* | (2018.01) |
| *F21S 41/25* | (2018.01) |

(52) U.S. Cl.
CPC ............ *F21S 41/37* (2018.01); *B60Q 1/1415* (2013.01); *F21S 41/25* (2018.01); *F21S 43/33* (2018.01)

(58) Field of Classification Search
CPC ........... F21S 41/645; F21S 41/33; F21S 41/37
See application file for complete search history.

(56) References Cited

U.S. PATENT DOCUMENTS

| 7,679,808 | B2 | 3/2010 | Kim |
| 8,179,588 | B2 | 5/2012 | Yamada et al. |
| 9,254,789 | B2 | 2/2016 | Anderson et al. |
| 2004/0145905 | A1 | 7/2004 | Strazzanti |
| 2014/0328078 | A1 | 11/2014 | Williams |

FOREIGN PATENT DOCUMENTS

| JP | 2007227202 A | * | 9/2007 | ............ F21S 41/645 |
| JP | 2007227202 A | | 9/2007 | |
| WO | 2019038141 A1 | | 2/2019 | |

OTHER PUBLICATIONS

PCT Patent Application PCT/2020/032810 International Search Report and Written Opinion dated Sep. 1, 2020.

* cited by examiner

*Primary Examiner* — Karabi Guharay
(74) *Attorney, Agent, or Firm* — Erise IP, P.A.

(57) ABSTRACT

A switchable vehicle lamp lens assembly includes a vehicle lamp assembly, which includes a lens having a first transparent layer and a second transparent layer adjacent the first transparent layer. A switchable electrochemical film is disposed between the first transparent layer and the second transparent layer, and one or more light sources is positioned behind the lens. In an active mode, the switchable electrochemical film is adapted to be substantially transparent when a voltage is provided, enabling light transmission through the lens from the one or more light sources. In a non-active mode, the switchable electrochemical film is adapted to be substantially opaque when the voltage is removed, blocking light from the one or more light sources. The switchable electrochemical film is alternately switched between the active mode and the non-active mode thereby switching the lens between a substantially transparent state and a substantially opaque state, respectively.

12 Claims, 11 Drawing Sheets

SWITCHABLE MIRROR LENS ASSEMBLY

CROSS-REFERENCE TO RELATED APPLICATIONS

This application claims the benefit of U.S. Provisional Patent Application No. 62/847,410 entitled "Switchable Mirror Lens Assembly" and filed on May 14, 2019, which is herein incorporated by reference in its entirety.

BACKGROUND

1. Field of the Disclosure

Embodiments of this disclosure relate generally to vehicle lamps. More specifically, embodiments of this disclosure include vehicle lamps configured to provide a mirrored surface appearance in one mode, and a transparent surface in another mode.

2. Description of the Related Art

Various switchable mirror devices are known. For example, U.S. Pat. No. 7,679,808 to Kim discloses a portable electronic device having a switchable mirror display capable of switching between a transparent state and a reflecting state. U.S. Pat. No. 9,254,789 to Anderson et al. discloses a rearview mirror assembly that includes a switchable mirror system. U.S. Pat. No. 8,179,588 to Yamada et al. discloses a switchable mirror element having a switchable layer to be reversibly changed from a transparent state to a mirror state.

SUMMARY

In an embodiment, a switchable vehicle lamp lens assembly includes a vehicle lamp assembly, which includes a lens having a first transparent layer and a second transparent layer adjacent the first transparent layer; a switchable electrochemical film disposed within the lens between the first transparent layer and the second transparent layer; and one or more light sources positioned behind the lens. In an active mode, the switchable electrochemical film is adapted to be substantially transparent when a voltage is provided, enabling light transmission through the lens from the one or more light sources. In a non-active mode, the switchable electrochemical film is adapted to be substantially opaque when the voltage is removed, blocking light from the one or more light sources. The switchable electrochemical film is alternately switched between the active mode and the non-active mode thereby switching the lens between a substantially transparent state and a substantially opaque state, respectively.

In another embodiment, a vehicle lamp assembly includes a switchable mirror lens. The switchable mirror lens includes a first transparent layer and a second transparent layer adjacent the first transparent layer, and an electrochemical film disposed between the first transparent layer and the second transparent layer. The switchable mirror lens has a shape and a curvature adapted to provide a covering for the vehicle lamp assembly. The vehicle lamp assembly further includes one or more light sources positioned behind the switchable mirror lens. The electrochemical film is adapted for switching between a substantially transparent state and a substantially reflective state based on an applied electric potential. The substantially transparent state enables transmission of light from the one or more light sources, and the substantially reflective state blocks light. The covering is adapted for providing a mirror-like reflective appearance that conceals the one or more light sources when the electrochemical film is in the substantially reflective state. A controller is adapted for controlling the applied electric potential according to an input signal such that an automotive lighting function is provided via the one or more light sources.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
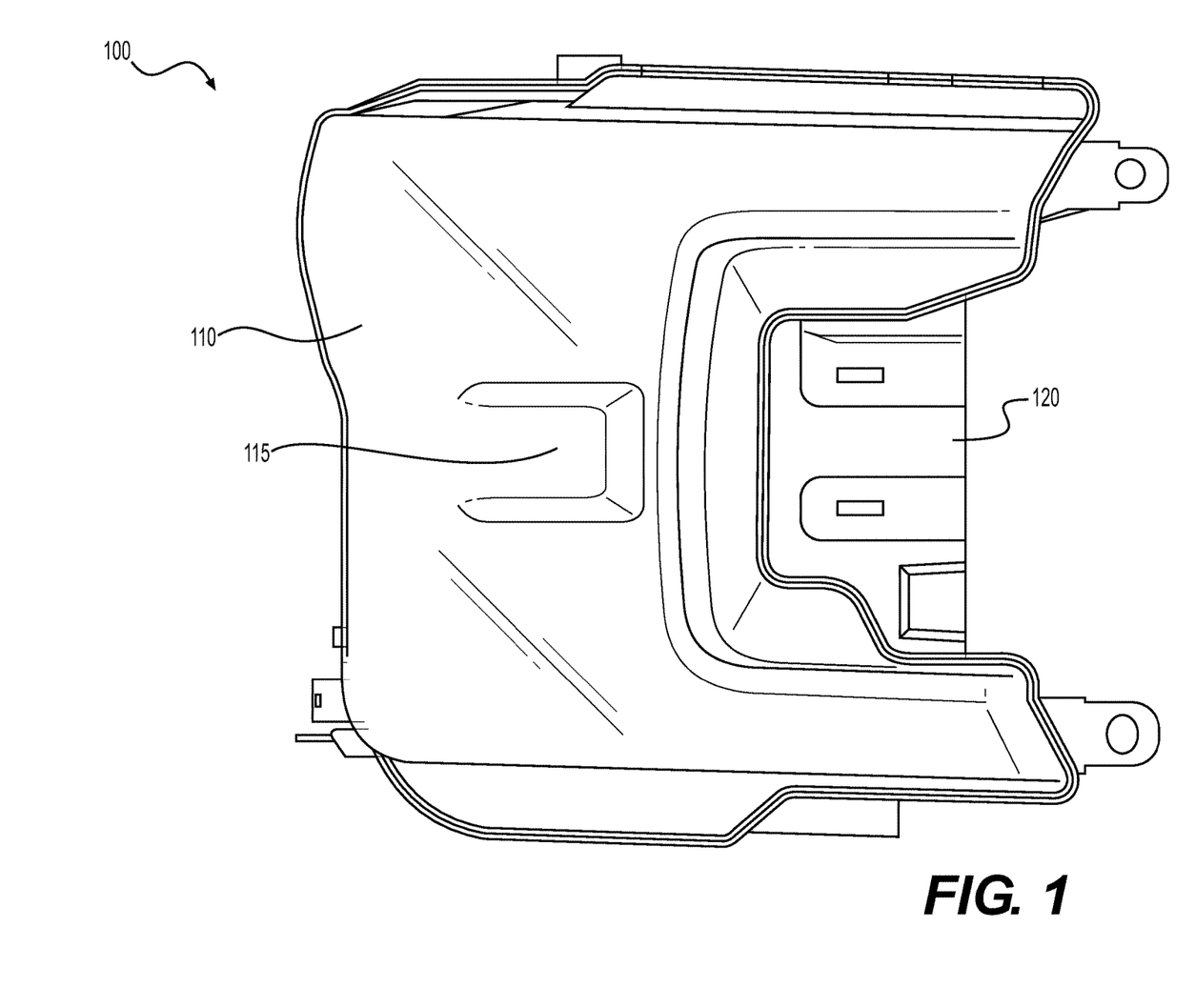
FIG. 1 is a front view of a switchable-mirror lens assembly in a non-active mode, in an embodiment.

FIG. 1 is a front view of an exemplary switchable-mirror lens assembly 100 in a non-active mode. The assembly 100 includes a switchable-mirror lens 110, which is referred to herein as "lens 110" for short. Lens 110 may be used in lamp assemblies as an inner lens or an outer lens, for example. Lens 110 is attached to a housing 120, which provides structural support for lamp assembly components and fixtures, and is configured for attaching to another structure, such as a vehicle. In certain embodiments, lens 110 is a lens for a vehicle lamp assembly, which includes but is not limited to headlight and taillight assemblies, center high-mounted stop lamps, multi-function light assemblies, fog lamps, turn signals, and reflectors. In certain embodiments, lens 110 is configured as an outer lens to provide an outer covering member that determines the outward appearance of the lamp assembly 100 and protects components that are internal to the lamp assembly 100, including but not limited to one or more light sources, graphics, inner lenses, reflex reflectors, bezels, etc.

Figure 2:
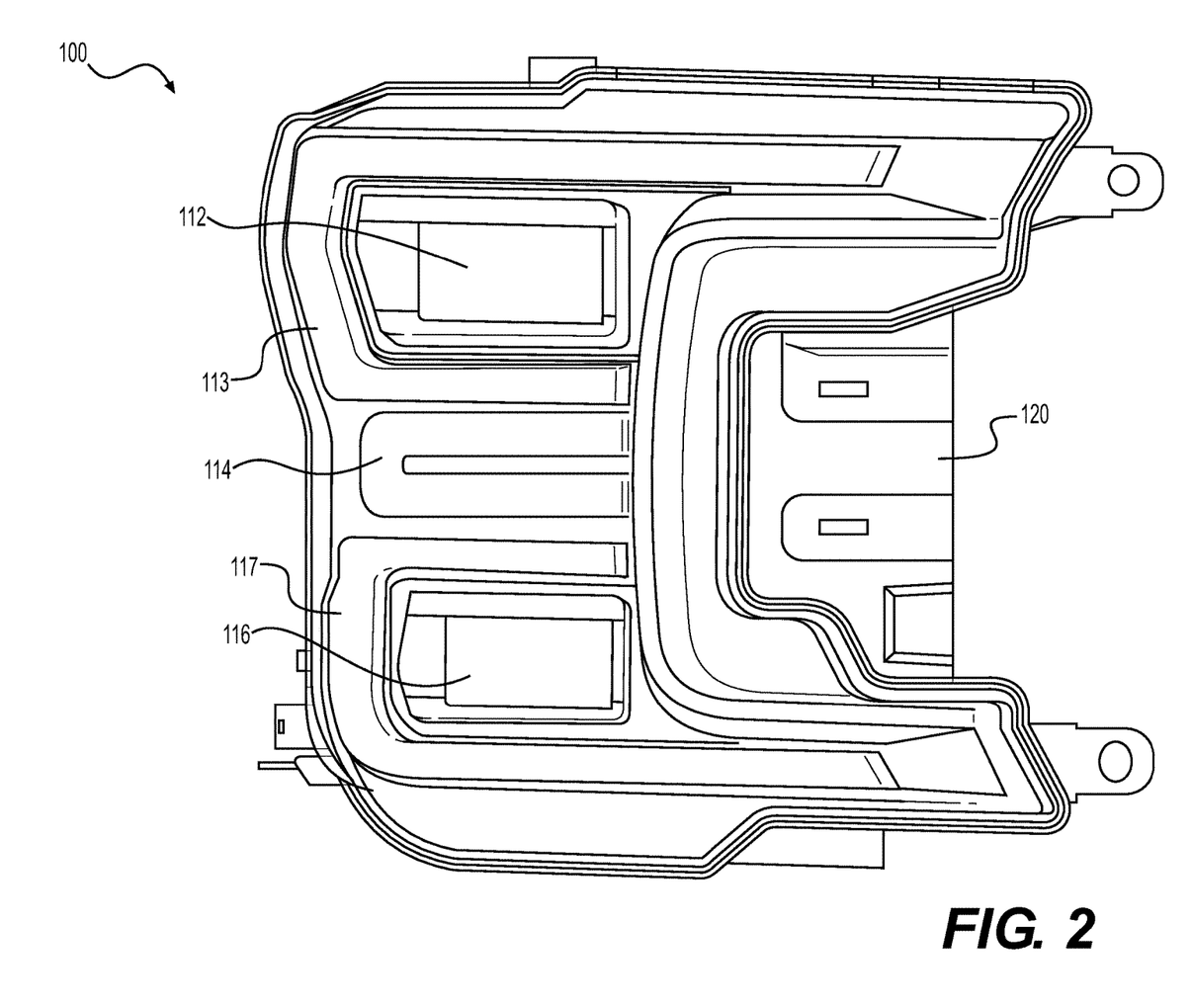
FIG. 2 is a front view of the switchable-mirror lens assembly of FIG. 1 in an active mode.

FIG. 2 is a front view of switchable-mirror lens assembly 100 in an active mode. Whereas in FIG. 1, the lens 110 is depicted in a non-active mode providing a mirror-like reflective surface, in FIG. 2 the lens 110 is depicted in an active mode in which lens 110 becomes substantially transparent, enabling components that are internal to the lamp assembly 100 to be partially or fully revealed. Internal components include but are not limited to a first light source 112, a second light source 113, a third light source 114, a fourth light source 116, and a fifth light source 117. The second light source 113 is for example a daylight-running light (DRL).

Lens 110 may be molded to include curvature, contoured portions, grooves, textured surfaces, and other features. These may correspond to inner workings of a lamp assembly, such as light sources, etc. (e.g., low-beam and high-beam light sources of a headlamp). For example, as shown in FIG. 1, a raised portion 115 includes an outwardly protruding section of lens 110. The raised portion 115 may be adapted for covering an underlying feature, such as third light source 114 shown in FIG. 2. Third light source 114 is for example a turn lens having optics configured for meeting inboard and outboard lighting requirements.

Figure 3:
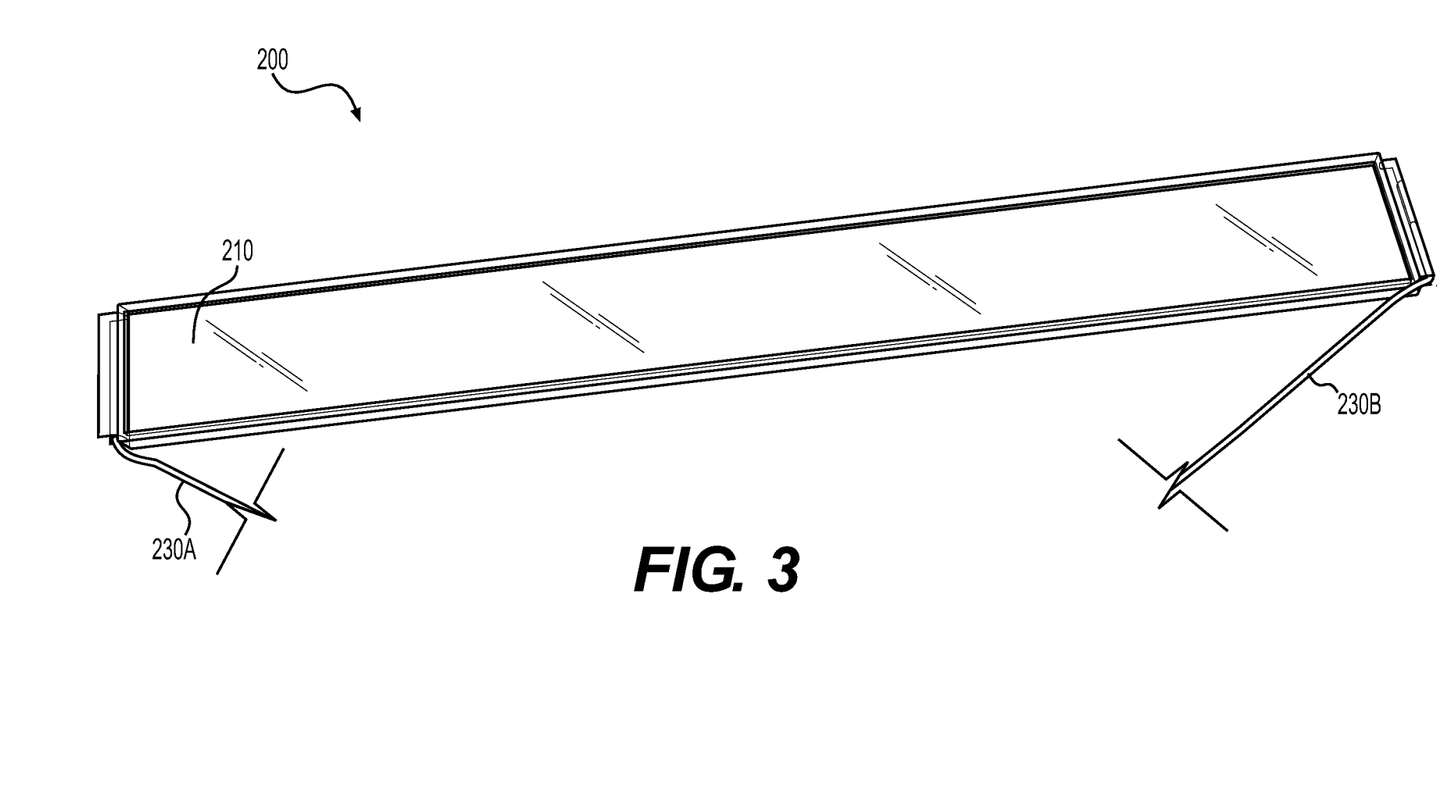
FIG. 3 is a perspective view of a switchable-mirror assembly, in an embodiment.
Figure 4:
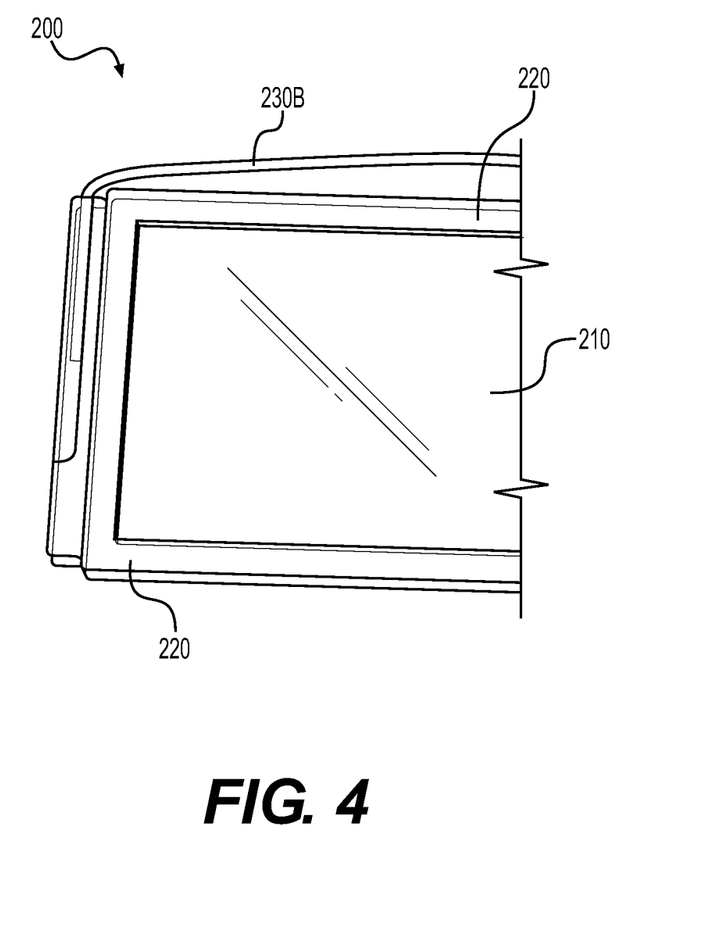
FIG. 4 is another perspective view of the switchable-mirror assembly of FIG. 3.

FIG. 3 and FIG. 4 are perspective views of an exemplary switchable-mirror assembly 200. FIGS. 3 and 4 are best viewed together with the following description. Switchable-mirror assembly 200 includes a switchable mirror 210 that may be adapted for use in switchable-mirror lens assembly 100. Switchable mirror 210 is an example of lens 110 of FIGS. 1 and 2 and is electrically connected with an electrical power source (e.g., battery). The electrical power source is used to provide an electric potential across an electrochemical film sandwiched between two transparent layers, as further described below in connection with FIG. 5. Electrodes are electrically connected (e.g., wired) to the electrochemical film for providing an electric potential across the film. As depicted in FIG. 3, a first electrical wire 230A and a second electrical wire 230B are each electrically coupled with the electrochemical film and the electrical power source (not shown).

In certain embodiments, a transparent portion 220 is included in the switchable-mirror assembly 200. As best viewed in FIG. 4, transparent portion 220 forms a border outside of switchable mirror 210. The transparent portion 220 may be a section of mirror assembly 200 that excludes the electrochemical film. In some embodiments, the switchable mirror includes a plurality of segments that are independently controlled between active and non-active modes, such that transparent portions and mirrored portions are controllable (see FIGS. 7A to 7F and their description below). A controller for controlling switching of segments between active and non-active modes is described below in connection with FIG. 8.

Figure 5:
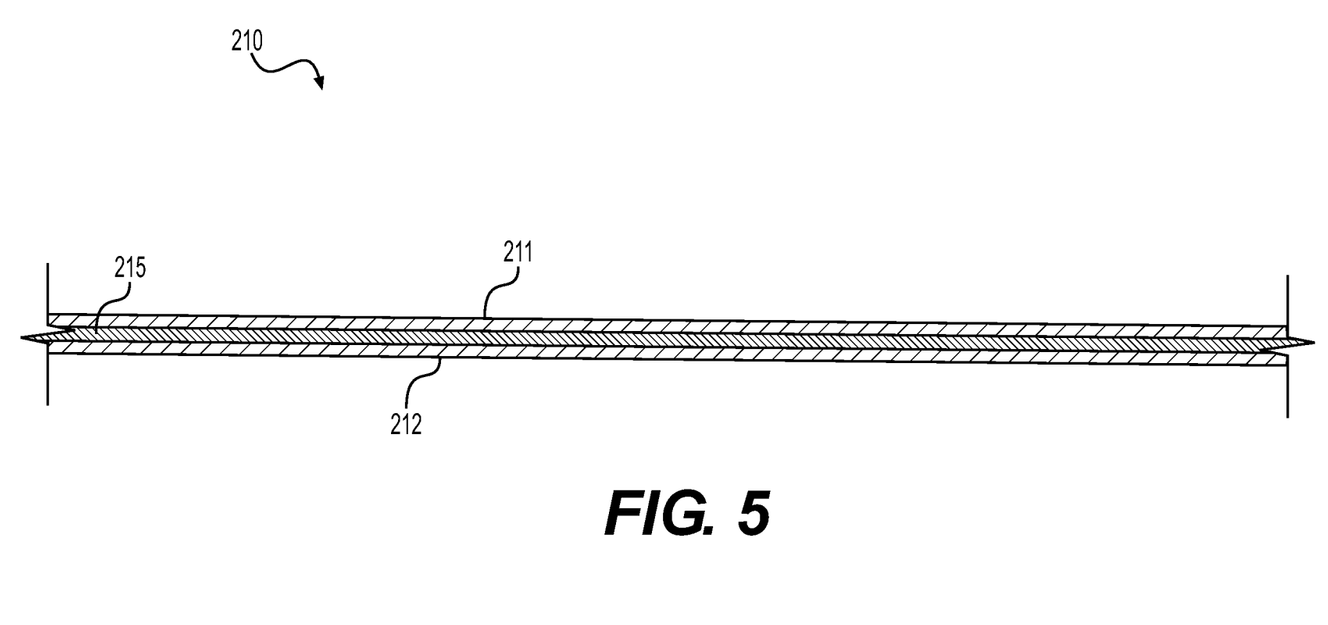
FIG. 5 is a cross-sectional side view of the switchable-mirror assembly of FIG. 3

FIG. 5 is a cross-sectional side view of switchable-mirror 210 of FIGS. 3 and 4. FIG. 5 depicts an electrochemical film 215 sandwiched between a first layer 211 and a second layer 212. The first layer 211 and the second layer 212 may be made of any transparent material, such as glass or plastic. In certain embodiments, the first layer 211 and the second layer 212 are molded parts made of a clear or transparent plastic, such as polycarbonate or acrylic. The first and second layers 211, 212 may be molded into a variety of shapes having curvature, protrusions, indentations, grooves, recesses, bulges, etc. The electrochemical film 215 is adapted to conform to the shape of the first and second layers 211, 212. In some embodiments, the electrochemical film may be disposed between the first and second layers 211, 212. Alternatively, the electrochemical film is disposed on an inner side of either one of the first and second layers 211, 212. The first and second layers 211, 212 are sandwiched together in such a way as to shape and protect the electrochemical film therebetween.

An electric potential is configured to align suspended particles in the film. Alignment of the suspended particles allows light to pass through the film, enabling switchable mirror 210 to function like a window by becoming substantially transparent. In the non-active mode depicted in FIGS. 3 and 4, the switchable mirror 210 is switched off such that no electric potential is applied across the electrochemical film 215. Without an electric potential, the suspended particles remain unorganized, and their random orientation blocks, absorbs, and/or reflects light, making switchable mirror 210 substantially opaque. In certain embodiments, the suspended particles are highly reflective such that when unorganized in the non-active mode, switchable mirror 210 substantially reflects light in such a way as to have an appearance of a reflective mirror-like surface.

To manufacture lens 210, electrochemical film 215 may be disposed on one of the first layer 211 or the second layer 212 by, for example, laminating electrochemical film 215 to the first layer 211 followed by attaching the second layer 212 on the opposite side of film 215 and bonding the layers 211, 212 and film 215 together (e.g., using heat) to arrive at the depicted sandwich arrangement shown in FIG. 5.

In certain embodiments, electrochemical film 215 is a thin film of polymer-dispersed liquid-crystals (e.g., as in a liquid-crystal display or "LCD"). Alternatively, in some embodiments, electrochemical film 215 is a thin film of an electrochromic material such as a transition-metal hydride electrochromic. Yet in other embodiments, electrochemical film 215 is a thin film laminate of particles suspended in liquid (e.g., as in a "suspended-particle device"). For all of these embodiments, a switch between transparent and non-transparent modes is controlled by a change in applied voltage, as further described below.

In operation, an active mode occurs when a voltage is applied to electrochemical film 215, and a non-active mode occurs when the voltage is removed. In the active mode, the suspended particles align in a particular orientation based on the electric potential across the film. In certain embodiments, the suspended particles are adapted to align for allowing light to pass, thereby creating a substantially transparent film. Therefore, in the active-mode, the lens 110 is switched to a transparent state for functioning like a typical lens (e.g., allowing light to pass), and for appearing like a typical lens of a lamp assembly. The transparent state may also be used to reveal underlying features beneath lens 210, including light sources, graphics, markings, etc. FIG. 2 shows lens assembly 100 in the active mode.

In the non-active mode shown in FIG. 1, the suspended particles remain unorganized, and their random orientation blocks, absorbs and/or reflects light making lens 110 substantially opaque, which conceals from view the inner workings of a lamp assembly. In certain embodiments, the suspended particles are highly reflective such that when unorganized in the non-active mode, lens 110 substantially reflects light in such a way as to create a reflective state in which lens 110 appears as a reflective mirror-like surface. In the non-active mode, electrochemical film 215 becomes highly reflective on both sides. Since the non-active mode is unpowered, it becomes the default mode such that, when the vehicle is not being operated, the switchable-mirror lens assembly 100 is in the reflective mirror-like state.

In certain embodiments, a partially active mode is configured to provide a semi-transparent reflective surface. The partially active mode may be accomplished using for example, pulse-width modulation (PWM), in which voltage applied to the electrochemical film 215 is rapidly turned on and off, such that suspended particles are, on average, partially aligned to provide a semi-transparent reflective appearance. The partially active mode may be controlled via a controller, such as controller 450 described below in connection with FIG. 8.

In certain embodiments, the active mode depicted in FIG. 2 uses a high voltage and a low current to charge the electrochemical film. When a light function from the lamp assembly is needed, the active mode is turned on causing the lens 110 to become transparent. In certain embodiments, the lens 110 attains between about 80% to about 90% transparency. In some embodiments, the lens 110 attains about 87% transparency, which is slightly less than a standard lens (e.g., normally between about 90% to about 93% transparency). However, the optics of the lens 110 are not affected by the decreased transparency, and an increase in light output from one or more light sources behind lens 110 may be used to account for the decreased transparency.

In the non-active mode depicted in FIG. 1, the mirrored reflectiveness of the lens 110 provides a sleek and streamlined appearance that hides the unattractive functional appearance of a typical lamp assembly. The switchable mirror lens 110 may be used to alternatively hide and reveal anything disposed behind the lens 110 when the electrochemical film is switched between the non-active and active modes, respectively. For example, the switchable mirror lens 110 may be used to alternatively hide and reveal one or more light sources, as further described below.

In the partially active mode, a controller (e.g., controller 450 shown in FIG. 8) implements PWM to control the level of transparency to any level between 0% (i.e., fully opaque) and 87% transparency (e.g., fully transparent).

Figure 6A:
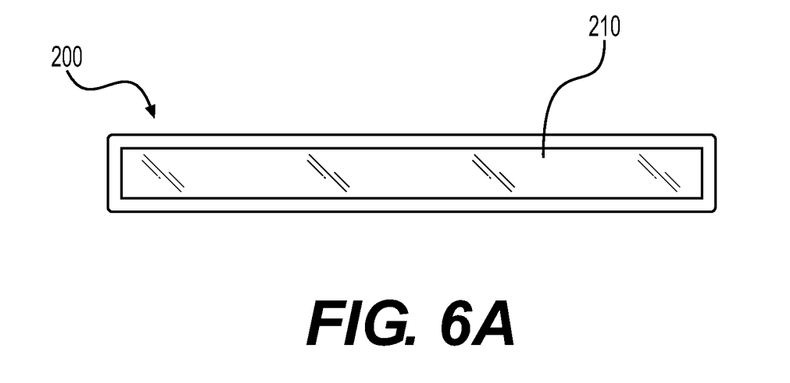
FIG. 6A is a front view of a switchable-mirror lens assembly in a non-active mode, in an embodiment.
Figure 6B:
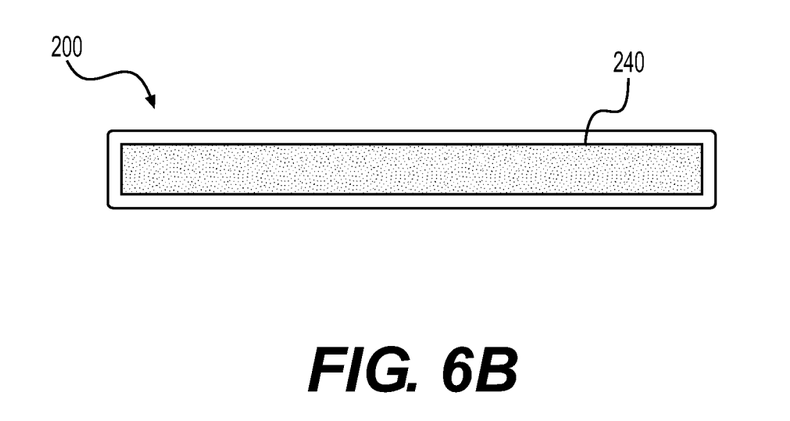
FIG. 6B is a front view of the switchable-mirror lens assembly of FIG. 6A in an active mode revealing a light source.

FIG. 6A is a front view of switchable-mirror lens assembly 200 in a non-active mode. FIG. 6B is a front view of switchable-mirror lens assembly 200 in an active mode revealing a light source 240. Lens assembly 200 is shown without electrical wires in FIGS. 6A, 6B for clarity of illustration. When lens assembly 200 is integrated into an outer lens of a vehicle lamp assembly, such as the assembly 100 of FIG. 1, in the non-active mode a mirror-like appearance conceals the light source 240, whereas in the active mode, lens 210 becomes transparent enabling the light source 240 to emit light out of the lens assembly 200.

Switchable-mirror lens assembly 200 with light source 240 may perform automotive lighting functions including for example: a low beam and a high beam function for a headlamp; a stop signal, a turn signal, and a taillight function for a taillight assembly; lighting functions for a center high-mounted stop lamp, a multi-function light assembly, and a fog lamp; and, concealing/revealing reflectors for passively reflecting ambient light in a predetermined color. For each of these lighting functions, when an underlying feature is not needed to be actively displayed, the underlying feature may be hidden from view behind lens 210 in the non-active (e.g., reflective) mode. For example, to provide a blinking turn signal, the lens 210 may be alternately switched between non-active and active modes for displaying a blinking light. The underlying light source 240 may also be blinking on/off in coordination with the lens 210 alternately becoming transparent/reflective. Alternatively, light source 240 may be constantly lit while the lens 210 alternately transitions between transparent and reflective states to produce a blinking appearance.

In an exemplary intended use, switchable-mirror lens assembly 200 is adapted to provide a taillight and stop signal by controlling lens 210 to be partially transparent for partially illuminating the taillight, and by controlling lens 210 to be substantially transparent when the vehicle brakes have been initiated for fully illuminating the stop signal. Control of lens 210 may be via a controller, such as a controller 450 described below in connection with FIG. 8. Partial illumination may be achieved via PWM, for example, as described above.

Figures 7A, 7B:
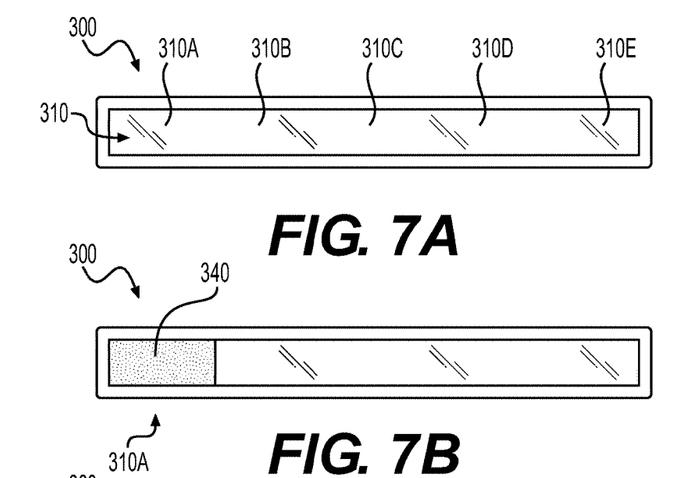
FIG. 7A is a front view of a segmented switchable-mirror lens assembly in a non-active mode, in an embodiment.
FIG. 7B is a front view of the segmented switchable-mirror lens assembly of FIG. 7A in which a first segment is in an active mode revealing a light source.

FIG. 7A is a front view of an exemplary segmented switchable-mirror lens assembly 300 in a non-active mode. Lens assembly 300 is an example of lens assembly 200 that includes a segmented lens 310. Segmented lens 310 includes a plurality of individually controllable switchable-mirror segments. For example, as depicted in FIGS. 7A-7F, segmented lens 310 includes five segments labeled 310A, 310B, 310C, 310D, and 310E. Segmented lens 310 may include greater than five segments or fewer than five segments, without departing from the scope hereof. Lines between the segments are not visible to the naked eye. Segments can be formed of any shape on curved or planar surfaces. Light source 300 may be used for automotive lighting functions including for example, a stop signal, a turn signal, a tail signal, or a center high-mounted stop lamp. The automotive lighting functions may be controlled via a vehicle controller, such as the controller described below in connection with FIG. 8.

As depicted in FIG. 7A, all five segments 310A-E are in the non-active mode such that all five segments appear fully reflective in the mirror-like state.

FIG. 7B is a front view of segmented switchable-mirror lens assembly 300 in which a first segment 310A of the segmented lens 310 is in the active mode making first segment 310A transparent, while the other segments 310B-E remain in a reflective state in the non-active mode. When first segment 310A is transparent in the active mode, underlying features are revealed, such as a light source 340. Light source 340 may include one or more light sources (e.g., light-emitting diodes) that are independently controllable.

Figure 7C:
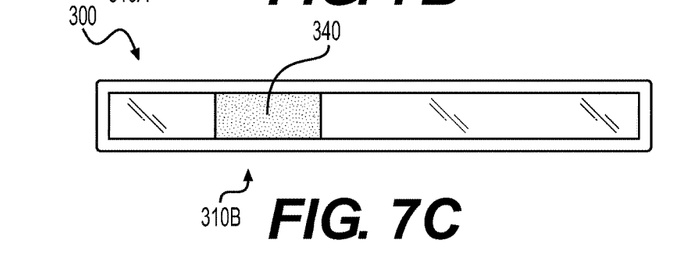
FIG. 7C is a front view of the segmented switchable-mirror lens assembly of FIG. 7A in which a second segment is in the active mode revealing a light source.

FIG. 7C is a front view of segmented switchable-mirror lens assembly 300 in which a second segment 310B is in an active mode revealing light source 340, while first segment 310A and the other segments 310C-E are reflective in the non-active mode.

Figures 7D, 7E:
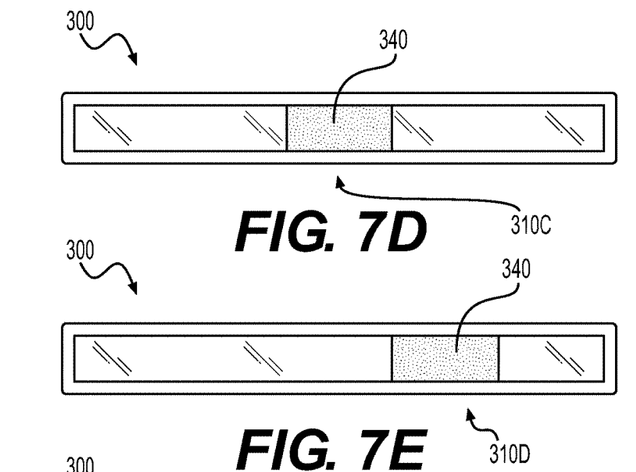
FIG. 7D is a front view of the segmented switchable-mirror lens assembly of FIG. 7A in which a third segment is in the active mode revealing a light source.
FIG. 7E is a front view of the segmented switchable-mirror lens assembly of FIG. 7A in which a fourth segment is in the active mode revealing a light source.

FIG. 7D is a front view of segmented switchable-mirror lens assembly 300 in which a third segment 310C is in an active mode revealing light source 340, while first segment 310A, second segment 310B, and the other segments 310D, 310E are reflective in the non-active mode.

FIG. 7E is a front view of segmented switchable-mirror lens assembly 300 in which a fourth segment 310D is in an active mode revealing light source 340, and first, second, and third segments 310A, 310B, 310C and segment 310E are all reflective in the non-active mode.

Figure 7F:
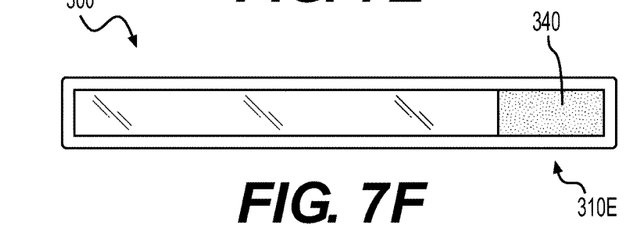
FIG. 7F is a front view of the segmented switchable-mirror lens assembly of FIG. 7A in which a fifth segment is in the active mode revealing a light source.

FIG. 7F is a front view of segmented switchable-mirror lens assembly 300 in which a fifth segment 310E is in an active mode revealing light source 340, while first, second, third, and fourth segments 310A, 310B, 310C, and 310D are reflective in the non-active mode.

Figure 7G:
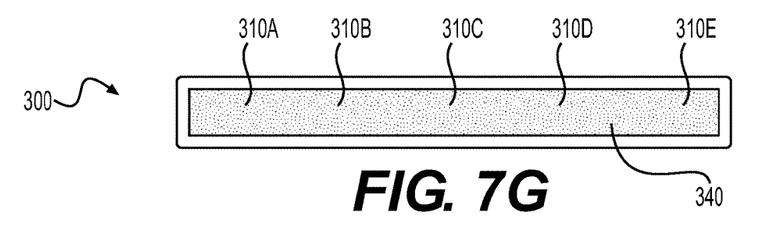
FIG. 7G is a front view of the segmented switchable-mirror lens assembly of FIG. 7A in which all segments are in the active mode revealing a light source.

FIG. 7G is a front view of segmented switchable-mirror lens assembly 300 in which all segments are in an active mode revealing light source 340 across the entire lens assembly 300.

Segmented switchable-mirror lens assembly 300 may be operated as a multifunction lens assembly by alternately switching one or more segments between transparent and reflective states (i.e., between active and non-active modes). Control of the switching may be performed under control of a controller 450 (e.g., see FIG. 8). Light source 340 may include one or more light sources, such as one or more light-emitting diodes (LEDs). In embodiments having a plurality of light sources, each of the light sources may be constantly lit or intermittently lit in coordination with the transparent state of a corresponding lens segment (e.g., under control of controller 450, FIG. 8). For example, light source 340 may include five individually controlled light sources, each one of light sources operated in coordination with a corresponding one of the lens segments 310A-E.

In an embodiment, segmented switchable-mirror lens assembly 300 may be operated as a taillight with a stop signal similar to switchable-mirror lens assembly 200, described above in connection with FIGS. 6A and 6B. In another embodiment, segmented switchable-mirror lens assembly 300 is adapted to provide a dynamic turn signal by controlling segments 310A-E, via controller 450, to each be made individually transparent in a predetermined sequence. This enables the lens assembly 300 to provide an active pattern of light transmission that appears to move across the lens assembly 300.

To indicate a right turn, initially the first segment 310A is activated to be transparent, followed by the second segment 310B, the third segment 310C, the fourth segment 310D, and finally the fifth segment 310E. The sequence may then be repeated until the turn signal is terminated. Conversely, to indicate a left turn, the sequence for emitting light from light source 340 would be performed in the opposite order, beginning with the fifth segment 310E and progressing to the first segment 310A.

Figure 8:
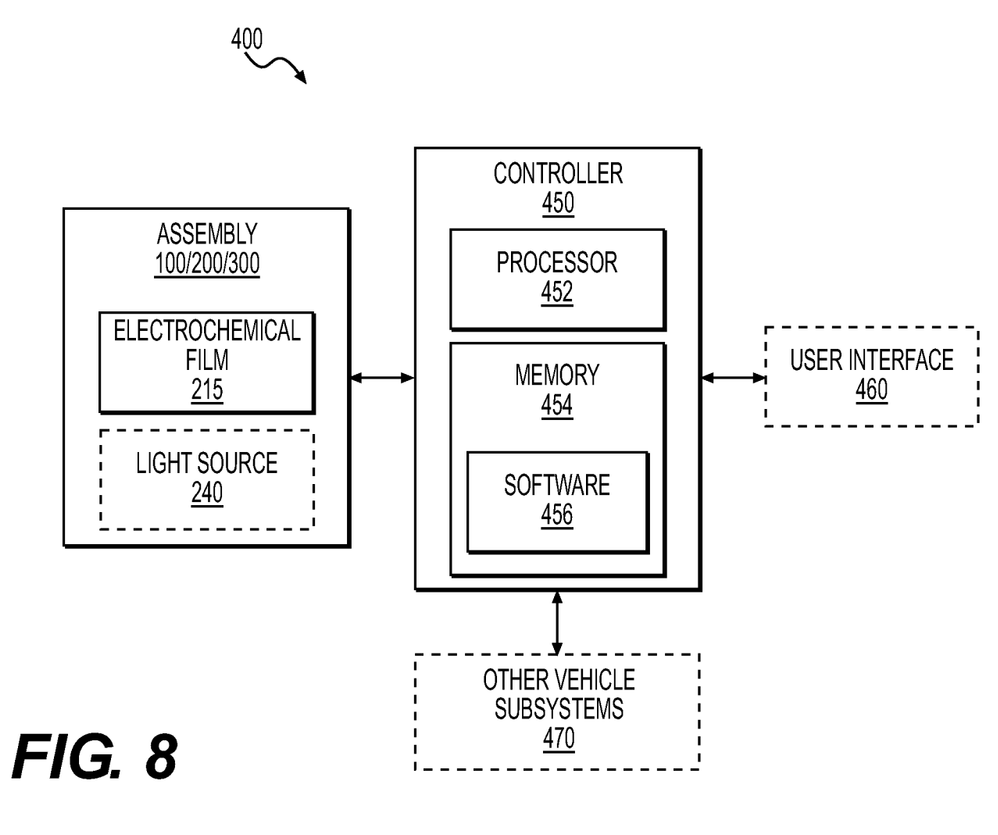
FIG. 8 is a block diagram showing components of a system for controlling a switchable-mirror lens assembly, in an embodiment.

FIG. 8 is a block diagram showing components of an exemplary system 800 for controlling assemblies 100, 200, 300, and 500 (lens assembly 500 is described below in connection with FIGS. 9-11). System 800 includes a controller 450, which is for example a computer, microcontroller, microprocessor, or programmable logic controller (PLC) having a memory 454, including a non-transitory medium for storing software 456, and a processor 452 for executing instructions of software 456. An optional user interface 460 enables a user to transmit instructions and receive information, as further described below. The controller 450 is not limited by the materials from which it is formed or the processing mechanisms employed therein and, as such, may be implemented via semiconductor(s) and/or transistors (e.g., electronic integrated circuits (ICs)), and so forth.

In certain embodiments, user interface 460 includes a user input device, which may include one or more buttons or switches located in a vehicle cabin or on a handheld device (e.g., a key fob) for controlling the lamp assemblies 100, 200, 300, 500. In some embodiments, user interface 460 includes a touch screen display device configured for receiving touch indications by the user. The touch screen display device may be located in the vehicle cabin and/or accessed remotely via a mobile device (e.g., smartphone, tablet, or laptop computer). User interface 460 may be configured to present a menu for selecting transparent/reflective states via the lamp assemblies 100, 200, 300, 500. With segmented assemblies 300 and 500, user interface 460 may be configured to present a menu for selecting various patterns of transparent/reflective states, as further described below.

In certain embodiments, controller 450 is optionally coupled communicatively with other vehicle subsystems 470. This enables automatic control of the assemblies 100, 200, 300, 500 based on input signals provided by other subsystems of the vehicle. For example, lamp assembly 200 may be triggered to reveal a concealed stop light by making electrochemical film 215 fully transparent in the active mode, in response to a stop signal provided by a sensor, the sensor being responsive to an activated braking mechanism. In an embodiment, when a user locks or unlocks the vehicle doors via a key fob, assemblies 100, 200, 300, 500 may alter their appearance (e.g., reflective, transparent, or partially reflective/transparent).

System 400 of FIG. 8 enables assemblies 100, 200, 300, 500 to provide automotive lighting functions (e.g., low/high beam headlight functions, stop/turn signals, etc.) or custom appearances (e.g., stylistic features or lighting) while also providing an ability to conceal features beneath the assemblies in a non-active (e.g., unpowered) mode.

Communication between user interface 460, controller 450, other vehicle subsystems 470, and the assembly 100, 200, 300, or 500 may be by a wired and/or wireless communication media. For example, controller 450 may include a transmitter/receiver, a multi-channel input/output (I/O) data bus, or the like (not shown) for communicatively coupling with user interface 460 and assembly 100, 200, 300, or 500. The controller 450 is programmed with instructions for sending signals to the electrochemical film 215 for switching the film 215, or individual segments of a segmented lens, between active, partially active, and non-active modes. Other electronics known to those of skill in the art may be used in conjunction with the controller 450 for switching the modes and for providing PWM without departing from the scope hereof. The controller 450 may also be programmed with instructions for controlling one or more lights of light source 240 in coordination with a corresponding electrochemical film 215, or corresponding segments of a segmented lens. The programmed instructions may be predetermined and/or responsive to inputs from the user interface 460 or other vehicle subsystems 470.

Switchable-mirror lens assembly 300 may be operated (e.g., under control of controller 450, FIG. 8) such that portions of segmented lens 310 are dynamically illuminated in a variety of predetermined or random patterns. For example, as described below in connection with FIGS. 9-11, a switchable-mirror lens assembly may be configured to provide a programmable display for producing custom or variable stylistic or decorative features on the exterior of a vehicle.

Figure 9:
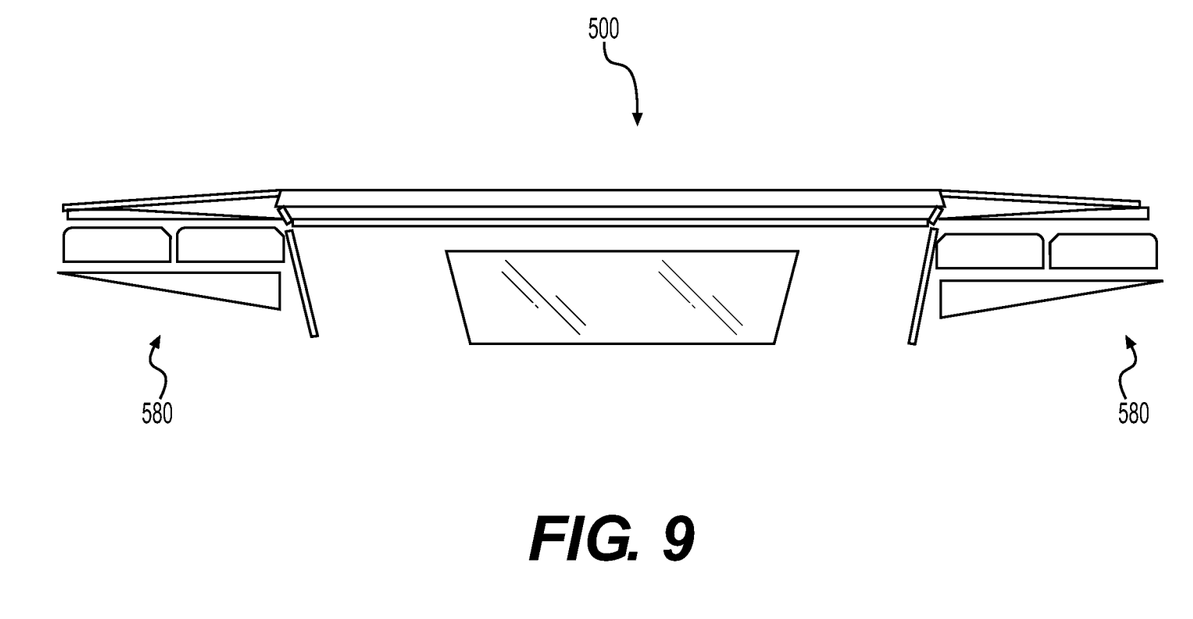
FIG. 9 is a front view of a segmented switchable-mirror lens assembly configured as a programmable front grill for display on a front end of a vehicle, in an embodiment.

FIG. 9 is a front view of an exemplary segmented switchable-mirror lens assembly 500 configured as a programmable front grill for display on a front end of a vehicle. Lens assembly 500, which is an example of switchable-mirror lens assembly 300 of FIGS. 7A-7G, includes a segmented lens, which is an example of segmented lens 310 of FIGS. 7A-7G. The segmented lens includes a plurality of switchable-mirror segments (e.g., between about 10 and about 1000 segments), which are formed by a segmented electrochemical film sandwiched between a first layer of transparent material and a second layer of transparent material (see e.g., description of FIG. 5 above). Lens assembly 500 may be installed on the front of the vehicle, such as between a pair of headlight assemblies 580. In some embodiments, lens assembly 500 is disposed in front of a traditional front grill for covering the front grill. The lens assembly 500 may optionally include holes, slots, or vents to enable airflow to reach the traditional front grill for air cooling the vehicle's radiator. For an electric vehicle, lens assembly 500 may be installed in place of a traditional grill since an electric vehicle may lack a radiator and therefore not require a traditional front grill that provides ventilation.

Figure 10:
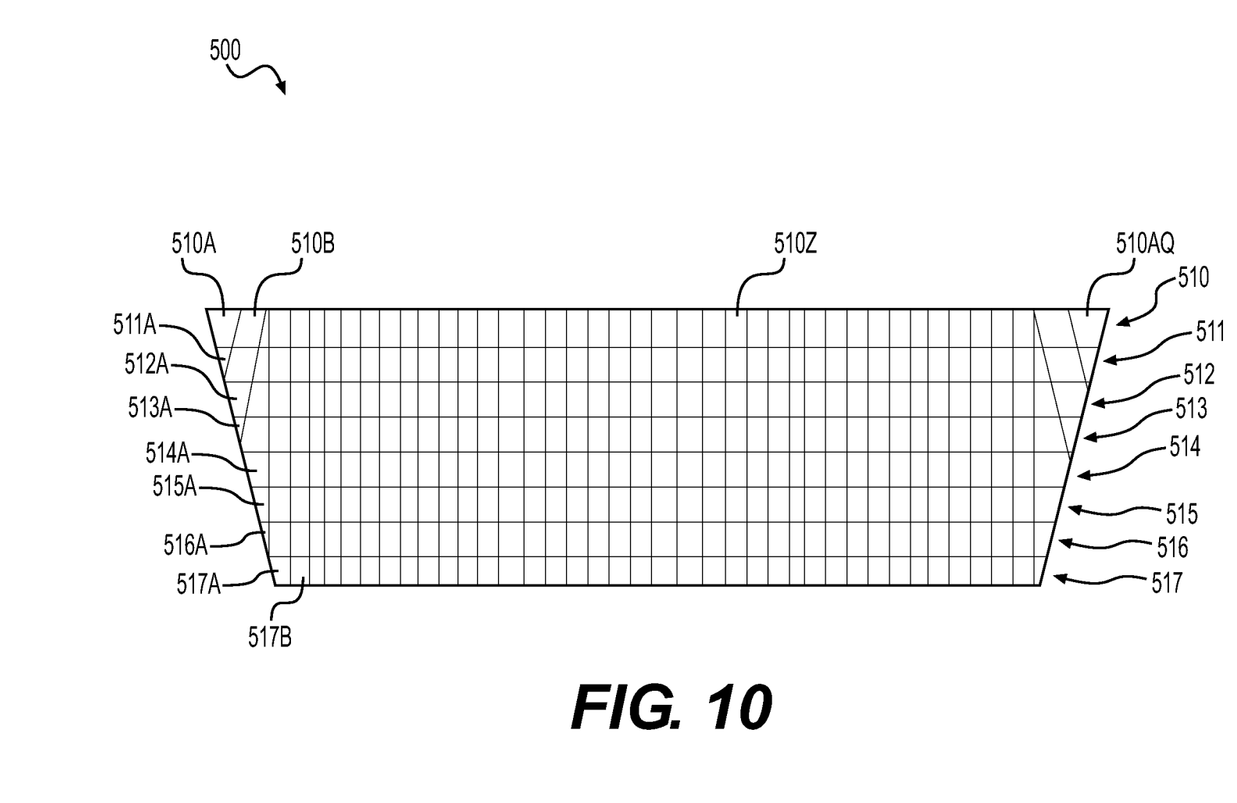
FIG. 10 is a close-up front view of the segmented switchable-mirror lens assembly of FIG. 9 illustrating a plurality of individually-controllable switchable-mirror segments, in an embodiment.

FIG. 10 is a close-up front view of lens assembly 500 illustrating a plurality of individually-controllable switchable-mirror segments. As with other embodiments of segmented lenses disclosed herein, lines between segments in segmented lens 510 are not visible to the naked eye. In the embodiment depicted in FIG. 10, eight rows of segments are shown, labeled 510 through 517, and many columns of segments are shown, labeled e.g., 510A through 510AQ. Not all segments are labeled in FIG. 10 for clarity of illustration. The individual segments may include a variety of shapes and sizes and may have various arrangements, without departing from the scope hereof. Since each switchable-mirror segment is individually controllable (e.g., via controller 450, FIG. 8) between active, non-active, and partially active modes, as described above, a variety of appearances may be provided via lens assembly 500 (see e.g., FIG. 11). For example, specific patterns of individual lens segments may be in the non-active mode to provide a reflective mirror-like surface, while other individual lens segments are active or partially active to provide full or partial transparency, respectively. Behind the lens assembly 500, various light sources may be disposed for providing different lighted colors and animated lighting effects. The light sources may be under control of a controller (e.g., controller 450, FIG. 8) for providing lighting effects that are coordinated with lens assembly 500.

Figure 11:
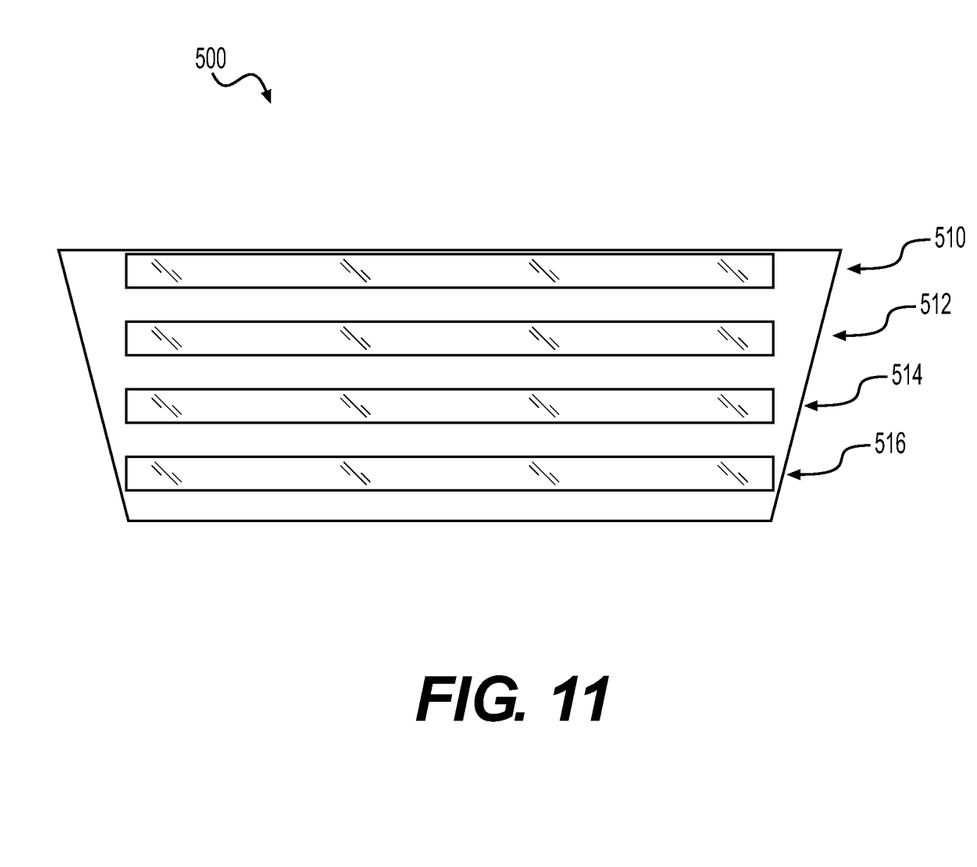
FIG. 11 is a close-up front view of the segmented switchable-mirror lens assembly of FIG. 10 with a pattern of lens segments in the non-active mode, in an embodiment.

FIG. 11 is a close-up front view of lens assembly 500 of FIG. 10 with an exemplary pattern of lens segments in the non-active mode. For example, at least some of the lens segments in rows 510, 512, 514, and 516 are in the non-active mode to provide four corresponding rectangular shapes of reflective mirror-like surface, while other portions of the lens assembly 500 are in the active mode making those portions substantially transparent. Lens assembly 500 enables a user to configure the appearance of the programmable front grill by selecting a design or pattern via a user interface (e.g., user interface 460 described above in connection with FIG. 8). The design or pattern may be static (e.g., it remains the same until receiving another input via user interface 460) or dynamic (e.g., the pattern changes based on preprogrammed instructions provided by controller 450).

Features described above as well as those claimed below may be combined in various ways without departing from the scope hereof. The following examples illustrate some possible, non-limiting combinations:

(A1) A switchable vehicle lamp lens assembly includes a vehicle lamp assembly, which includes a lens having a first transparent layer and a second transparent layer adjacent the first transparent layer. A switchable electrochemical film is disposed within the lens between the first transparent layer and the second transparent layer. One or more light sources is positioned behind the lens. In an active mode, the switchable electrochemical film is adapted to be substantially transparent when a voltage is provided, enabling light transmission through the lens from the one or more light sources. In a non-active mode, the switchable electrochemical film is adapted to be substantially opaque when the voltage is removed, blocking light from the one or more light sources. The switchable electrochemical film is alternately switched between the active mode and the non-active mode thereby switching the lens between a substantially transparent state and a substantially opaque state, respectively.

(A2) For the switchable vehicle lamp lens assembly denoted as (A1), in the non-active mode, the lens may be configured to conceal internal components of the vehicle lamp assembly including the one or more light sources.

(A3) For the switchable vehicle lamp lens assembly denoted as (A1) or (A2), a controller may be configured for controlling when the switchable electrochemical film is alternately switched between the active mode and the non-active mode such that the vehicle lamp assembly may be configured to provide an automotive lighting function.

(A4) For the switchable vehicle lamp lens assembly denoted as any of (A1) through (A3), the vehicle lamp assembly may be a taillight assembly configured to provide a stop signal function, a turn signal function, and a taillight function.

(A5) For the switchable vehicle lamp lens assembly denoted as any of (A1) through (A4), the vehicle lamp assembly is a headlight assembly configured to provide a low beam function and a high beam function.

(A6) For the switchable vehicle lamp lens assembly denoted as any of (A1) through (A5), the switchable electrochemical film may be adapted to provide a reflective mirror-like appearance when switched to the non-active mode.

(A7) For the switchable vehicle lamp lens assembly denoted as any of (A1) through (A6), a user interface may be communicatively coupled with the controller, the user interface being adapted to receive a user indication and transmit an input signal indicative of the user indication to the controller for switching between the active mode and the non-active mode.

(A8) For the switchable vehicle lamp lens assembly denoted as any of (A1) through (A7), the controller may be adapted to provide pulse-width modulation of the switchable electrochemical film for providing the lens with a semi-transparent reflective appearance.

(A9) For the switchable vehicle lamp lens assembly denoted as any of (A1) through (A8), the electrochemical film may include a plurality of segments arranged in different portions of the lens, each of the plurality of segments being independently controllable via the controller.

(A10) For the switchable vehicle lamp lens assembly denoted as any of (A1) through (A9), the plurality of segments may be configured for providing a dynamic turn signal by individually controlling the plurality of segments via the controller according to a predetermined sequence, such that the different portions of the lens are illuminated by the one or more light sources in an active pattern across the vehicle lamp assembly.

(A11) For the switchable vehicle lamp lens assembly denoted as any of (A1) through (A10), the vehicle lamp assembly is adapted as a programmable front grill on a vehicle, the programmable front grill having a segmented lens in which the electrochemical film includes a plurality of segments, the plurality of segments each being individually switchable via the controller between the active mode and the non-active mode, the appearance of the programmable front grill being determined based on a user indication selected from the user interface.

(B1) A vehicle lamp assembly includes a switchable mirror lens. The switchable mirror lens includes a first transparent layer and a second transparent layer adjacent the first transparent layer, and an electrochemical film disposed between the first transparent layer and the second transparent layer. The switchable mirror lens has a shape and a curvature adapted to provide a covering for the vehicle lamp assembly. The vehicle lamp assembly further includes one or more light sources positioned behind the switchable mirror lens. The electrochemical film is adapted for switching between a substantially transparent state and a substantially reflective state based on an applied electric potential. The substantially transparent state enables transmission of light from the one or more light sources, and the substantially reflective state blocks light. The covering is adapted for providing a mirror-like reflective appearance that conceals the one or more light sources when the electrochemical film is in the substantially reflective state. A controller is adapted for controlling the applied electric potential according to an input signal such that an automotive lighting function is provided via the one or more light sources.

(B2) For the vehicle lamp assembly denoted as (B1), the controller may be adapted to provide a partially transparent state via pulse-width modulation of the applied electric potential such that the electrochemical film is partially reflective and semi-transparent.

(B3) For the vehicle lamp assembly denoted as (B1) or (B2), the electrochemical film may include a plurality of segments in a plurality of portions of the switchable mirror lens, respectively, each of the plurality of segments being independently controllable via the controller.

(B4) For the vehicle lamp assembly denoted as any of (B1) through (B3), the input signal may be provided to the controller via a user input device.

Many different arrangements of the various components depicted, as well as components not shown, are possible without departing from the spirit and scope of the present disclosure. Embodiments of the present disclosure have been described with the intent to be illustrative rather than restrictive. Embodiments of the present disclosure have been described in the context of vehicle headlamps, but other uses and alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A switchable vehicle lamp lens assembly, comprising:
 a vehicle lamp assembly, comprising:
  a lens having a first transparent layer and a second transparent layer adjacent the first transparent layer;
  a switchable electrochemical film disposed within the lens between the first transparent layer and the second transparent layer; and
  one or more light sources positioned behind the lens;
  in an active mode, the switchable electrochemical film is adapted to be substantially transparent when a voltage is provided thereby enabling light transmission through the lens from the one or more light sources;
  in a non-active mode, the switchable electrochemical film is adapted to be substantially opaque when the voltage is removed thereby blocking light from the one or more light sources;
 a controller configured for controlling when the switchable electrochemical film is alternately switched between the active mode and the non-active mode such that the vehicle lamp assembly is configured to provide an automotive lighting function;
 wherein the switchable electrochemical film comprises a plurality of segments, each of the plurality of segments being independently controllable via the controller for switching between the active mode and the non-active mode to provide a multifunction lens; and
 a user interface communicatively coupled with the controller, the user interface being adapted to present a menu for selecting various patterns of transparent and reflective states among the plurality of segments, and to receive a user indication and transmit an input signal indicative of the user indication to the controller.

2. The switchable vehicle lamp lens assembly of claim 1, wherein in the non-active mode, the lens is configured to conceal internal components of the vehicle lamp assembly including the one or more light sources.

3. The switchable vehicle lamp lens assembly of claim 1, wherein the vehicle lamp assembly is a taillight assembly configured to provide a stop signal function, a turn signal function, and a taillight function.

4. The switchable vehicle lamp lens assembly of claim 1, wherein the switchable electrochemical film is adapted to provide a reflective mirror-like appearance when switched to the non-active mode.

5. The switchable vehicle lamp lens assembly of claim 1, wherein the controller is adapted to provide pulse-width modulation of the switchable electrochemical film for providing the lens with a semi-transparent reflective appearance.

6. The switchable vehicle lamp lens assembly of claim 1, wherein the plurality of segments are arranged adjacent one another to form a horizontal array and each of the plurality of segments is sequentially activated to become substantially transparent, such that the different portions of the lens are configured for illumination by the one or more light sources in an active pattern that appears to move across the vehicle lamp assembly for providing an animated turn signal.

7. The switchable vehicle lamp lens assembly of claim 1, wherein the vehicle lamp assembly is adapted as a programmable front grill on a vehicle, the programmable front grill having a segmented lens in which the electrochemical film includes a plurality of segments, the plurality of segments each being individually switchable via the controller between the active mode and the non-active mode, the appearance of the programmable front grill being modified based on a user indication selected from the user interface.

8. The switchable vehicle lamp lens assembly of claim 1, wherein the user interface comprises a touch screen display device.

9. The switchable vehicle lamp lens assembly of claim 1, wherein the user interface comprises a mobile device.

10. A vehicle lamp assembly, comprising:
 a switchable mirror lens, comprising:
  a first transparent layer and a second transparent layer adjacent the first transparent layer;

a segmented electrochemical film having a plurality of segments disposed between the first transparent layer and the second transparent layer; and the switchable mirror lens having a shape and a curvature adapted to provide a covering for the vehicle lamp assembly;

one or more light sources positioned behind the switchable mirror lens;

wherein each of the plurality of segments of the segmented electrochemical film is adapted for switching between a substantially transparent state and a substantially reflective state based on an applied electric potential, the substantially transparent state enabling transmission of light from the one or more light sources, and the substantially reflective state;

providing a mirror-like reflective appearance;

a mobile device adapted to receive a user indication for selecting various patterns of transparent and reflective states among the plurality of segments; and a controller adapted for controlling the applied electric potential to each of the plurality of segments according to the user indication.

11. The vehicle lamp assembly of claim 10, wherein the controller is adapted to provide a partially transparent state via pulse-width modulation of the applied electric potential such that the electrochemical film is partially reflective and semi-transparent.

12. A switchable mirror lens for a vehicle, comprising:

a switchable mirror lens having a plurality segments for switching between transparent and reflective states;

a controller adapted for individually controlling the transparent and reflective states for each of the plurality of segments;

a user interface adapted to present a menu and receive a user indication for selecting various patterns of transparent and reflective states among the plurality of segments; and wherein the switchable mirror lens is configured as a programmable front grill on a vehicle and the appearance of the programmable front grill is configured for modification based on the user indication selected from the user interface.

* * * * *